United States Patent
Theodosiou

(10) Patent No.: US 10,232,859 B2
(45) Date of Patent: Mar. 19, 2019

(54) CONTROL SYSTEM FOR A MACHINE

(71) Applicant: Caterpillar Underground Mining Pty. Ltd., South Burnie, Tasmania (AU)

(72) Inventor: Noel Thomas Theodosiou, Cooee (AU)

(73) Assignee: Caterpillar Underground Mining Pty Ltd, Burnie (AU)

(*) Notice: Subject to any disclaimer, the term of this patent is extended or adjusted under 35 U.S.C. 154(b) by 94 days.

(21) Appl. No.: 15/377,203

(22) Filed: Dec. 13, 2016

(65) Prior Publication Data

US 2018/0162413 A1 Jun. 14, 2018

(51) Int. Cl.
| | | |
|---|---|---|
| B60W 10/10 | (2012.01) |
| B60W 10/18 | (2012.01) |
| B60W 30/18 | (2012.01) |
| B60W 50/12 | (2012.01) |
| B60W 50/14 | (2012.01) |
| E02F 9/16 | (2006.01) |
| E02F 9/20 | (2006.01) |
| E02F 9/22 | (2006.01) |
| E02F 9/26 | (2006.01) |

(52) U.S. Cl.
CPC ........... *B60W 50/12* (2013.01); *B60W 50/14* (2013.01); *E02F 9/163* (2013.01); *E02F 9/2083* (2013.01); *E02F 9/226* (2013.01); *E02F 9/268* (2013.01); *B60W 10/10* (2013.01); *B60W 10/182* (2013.01)

(58) Field of Classification Search
CPC ............ B60W 10/01; B60W 10/182; B60W 30/18054; B60W 50/12; B60W 50/14; B60W 2710/186; B60W 2710/188; B60W 10/10; E05F 15/40
See application file for complete search history.

(56) References Cited

U.S. PATENT DOCUMENTS

| | | | |
|---|---|---|---|
| 5,839,304 A | 11/1998 | Wills | |
| 6,450,587 B1 | 9/2002 | MacGregor et al. | |
| 8,485,301 B2 * | 7/2013 | Grubaugh | B60T 7/14 |
| | | | 180/273 |
| 9,038,563 B1 | 5/2015 | Steinbring | |
| 9,133,604 B2 | 9/2015 | Kodaka et al. | |
| 9,150,208 B2 | 10/2015 | Schemmel | |
| 9,381,895 B1 * | 7/2016 | Smathers | B60T 7/12 |
| 2003/0221922 A1 | 12/2003 | Callow | |
| 2009/0314590 A1 | 12/2009 | Dagh et al. | |
| 2018/0105178 A1 * | 4/2018 | Khafagy | B60W 30/18054 |
| 2018/0134252 A1 * | 5/2018 | Theodosiou | B60R 25/2036 |
| 2018/0148057 A1 * | 5/2018 | Khafagy | B60W 30/18054 |

FOREIGN PATENT DOCUMENTS

| | | |
|---|---|---|
| CN | 105383460 A | 3/2016 |
| DE | 10 2008 020 843 A1 | 10/2009 |

* cited by examiner

*Primary Examiner* — David R Morris
(74) *Attorney, Agent, or Firm* — Finnegan, Henderson, Farabow, Garrett & Dunner, LLP

(57) ABSTRACT

A control system for a machine may include a door sensor configured to generate a closed signal when a door of a cab of the machine is in a closed position, and an Electronic Control Module (ECM) communicably coupled to the door sensor and configured to detect the closed signal. The ECM is programmed to prevent release of a parking brake of the machine if the ECM does not detect the closed signal for the door.

16 Claims, 4 Drawing Sheets

CONTROL SYSTEM FOR A MACHINE

TECHNICAL FIELD

The present disclosure generally relates to a control system for a machine. More particularly, the present disclosure relates to a control system and method for controlling parking brake release and alerts for the machine.

BACKGROUND

Machines that are used in the construction field typically employ various measures in their operational schema to reduce risks to operating personnel, as well as personnel located in the vicinity of such machines. For example, such machines may include a parking brake that when engaged can prevent the machine from rolling if positioned on a slope or grade. Failure by the operator of a machine to properly utilize the parking brake could lead to unintended machine movement.

One parking brake system is described in U.S. Patent Application Publication No. 2009/0314590 (the '590 application) by Dagh et al. published Dec. 24, 2009. The '590 application describes a system where the parking brake is automatically applied in response to the driver's door lock being locked. Although the system of the '590 application may act to prevent unintended movement of a machine under certain circumstances where the driver's door is locked, there remains room for improvement, particularly in preventing unintended or undesired movement of a vehicle under other circumstances.

The disclosed systems and methods are directed to overcoming one or more of the problems set for above and/or other problems of the prior art.

SUMMARY

In one aspect, the present disclosure is directed to a control system of a machine. The control system may include a door sensor configured to generate a closed signal when a door of a cab of the machine is in a closed position. The control system may also include an Electronic Control Module (ECM) communicably coupled to the door sensor and configured to detect the closed signal, wherein the ECM is programmed to prevent release of a parking brake of the machine if the ECM does not detect the closed signal for the door.

In another aspect, the present disclosure is directed to a method of controlling operation of a machine. The method may include receiving a closed signal for a door sensor when a door of a cab of the machine is in a closed position. The method may also include preventing release of a parking brake of the machine via an electronic control module (ECM) of the machine if the ECM does not detect the closed signal for the door.

In another aspect, the present disclosure is directed to a machine. The machine may include a work implement, a drive system, and a set of ground engaging members. The machine may also include a transmission system coupled to the drive system and the set of ground engaging members. The machine may also include a cab having a door configured to allow an operator to enter and exit the machine and a control system communicably coupled to the transmission system. The control system may include a door sensor configured to generate a closed signal when the door is in a closed position. The control system may also include an Electronic Control Module (ECM) communicably coupled to the door sensor and configured to detect the closed signal, wherein the ECM is programmed to prevent release of a parking brake of the machine if the ECM does not detect the closed signal for the door.

Other features and aspects of this disclosure will be apparent from the following description and the accompanying drawings.

DETAILED DESCRIPTION

Figure 1:
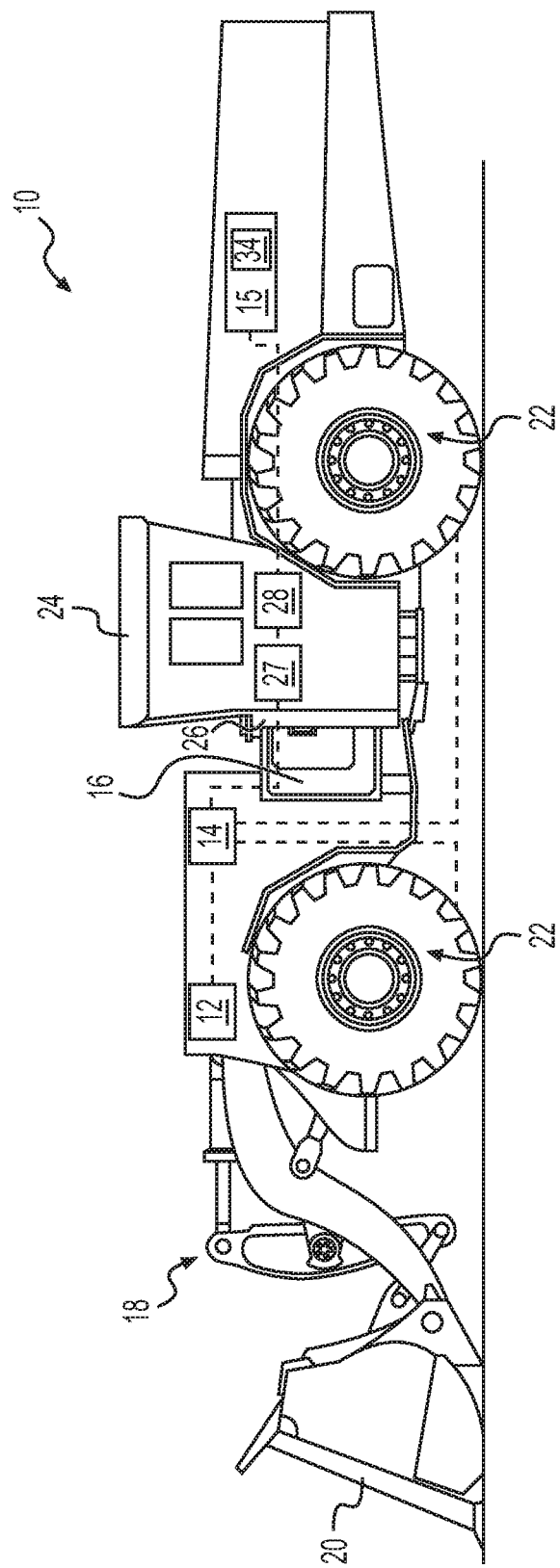
FIG. 1 is a side-view illustration of an exemplary disclosed machine.

FIG. 1 illustrates an exemplary embodiment of a machine 10, according to the present disclosure. Machine 10 is embodied in the form of a Load Haul Dumper (LHD), as shown in FIG. 1. Machine 10 may be used in a variety of applications including mining, quarrying, road construction, construction site preparation, etc. For example, the LHD of the present disclosure may be employed for hauling earth materials such as ore, soil, debris, or other naturally occurring deposits from a worksite.

Although machine 10 is embodied as a LHD in the illustrated embodiment of FIG. 1, it will be appreciated that the other types of machines such as, for example, but not limited to, trucks, shovels, diggers, buckets, hydraulic excavators, motor graders, and the like can be optionally used in lieu of the LHD disclosed herein to implement the embodiments of the present disclosure. Therefore, notwithstanding any particular configuration of machine disclosed in this document, it may be noted that embodiments disclosed herein can be similarly applied to other types of machines without deviating from the spirit of the present disclosure.

As illustrated in FIG. 1, machine 10 may include a drive system 12, a transmission system 14, a brake system 15, an articulated steering system 16, an articulation system 18, a work implement 20 (e.g., a bucket), and multiple ground engaging members. The ground engaging members may be in the form of tracks for a track-type machine or a set of wheels 22, as illustrated in FIG. 1. Drive system 12 may include an engine (not shown), an electric motor (e.g., a traction motor (not shown)), or both depending on specific requirements of an application. Transmission system 14 may include gears, differential systems, axles, and other components (not shown) that are coupled to drive system 12 and wheels 22 of machine 10. Transmission system 14 may be configured to transfer power from drive system 12 to wheels 22 in order to drive machine 10.

Brake system 15 may include a parking brake 34 and service brakes for controlling the speed of machine 10. The service brakes may be actuated by modulated hydraulic pressure, while parking brake 34 may be spring applied and hydraulic released. This configuration may assure parking brake 34 is applied in the event of hydraulic failure. Parking brake 34 may take the form of a disc brake or other suitable type brake. Parking brake 34 may be applied to one or more of wheels 22.

Articulated steering system 16 allows wheels 22 to accomplish steering of machine 10. Articulation system 18 may be operatively coupled to work implement 20. Articulation system 18 may include linkages hydraulically actuated that enable articulation of work implement 20 during operation. Work implement 20 may operatively perform functions such as, but not limited to, hauling and dumping materials.

Machine 10 also includes a cab 24 located in a central region of machine 10 between wheels 22. Cab 24 may have a door 26 configured to allow access to an operator for entering and exiting cab 24. As such, cab 24 is sized and shaped to house an operator of the machine 10. In some embodiments, door 26 may be located at the front of cab 24 and may open towards articulated steering system 16. Cab 24 may include an operator station 27 designed to enable an operator full control of machine 10. Operator station 27 may have a plurality of control implements and indicators, including for example, levers, switches, gauges, bulbs, joysticks, and pedals (not shown). Operator station 27 may include a parking brake release switch, which an operator may switch or press to initiate release of parking brake 34.

Machine 10 may also include a control system 28, which may interface with and implement inputs from operator station 27. In order to implement inputs from operator station 27, control system 28 may be communicably coupled to drive system 12, transmission system 14, brake system 15, articulated steering system 16, articulation system 18, and operator station 27 of machine 10.

Figure 2:
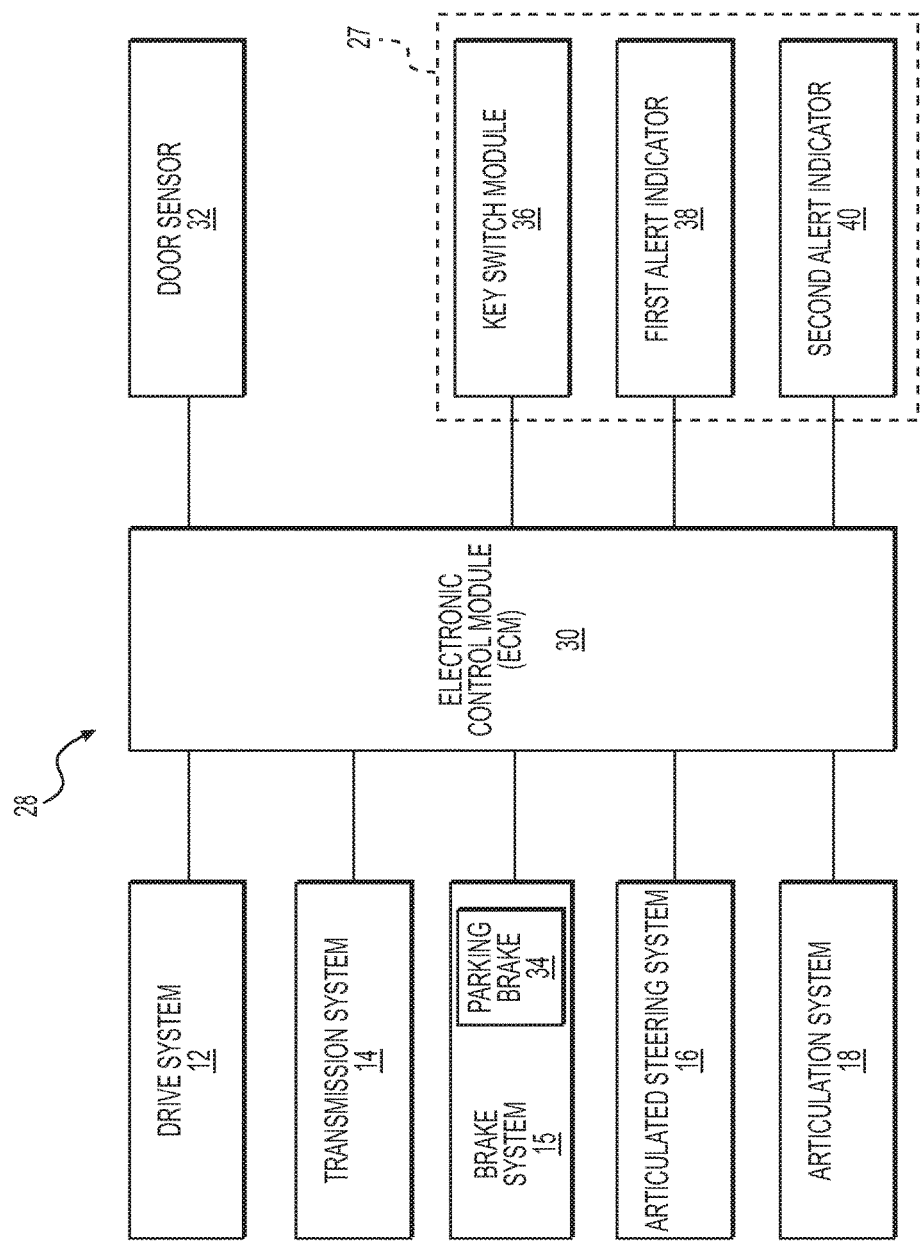
FIG. 2 is a schematic of a control system for controlling operation of the machine of FIG. 1.

Referring to FIG. 2, a schematic representation of control system 28 is illustrated. Control system 28 may include, among other things, an electronic control module (ECM) 30. ECM 30 may include any electronic control module, controller, processor, or other computing device(s) comprising various combinations of one or more Application Specific Integrated Circuit(s) (ASIC), Field-Programmable Gate Arrays (FPGA), electronic circuit(s), central processing unit(s), microprocessor(s) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality.

ECM 30 may be communicably coupled to a door sensor 32, which may form part of control system 28. Door sensor 32 may be configured to generate a closed signal when door 26 is in a closed position (e.g., a fully closed and latched position). ECM 30 may be configured to detect the closed signal and utilize the closed signal to control operation of machine 10 and various systems (e.g., brake system 15) of machine 10. For example, ECM 30 may be programmed to prevent release of parking brake 34 of machine 10 if ECM 30 does not detect the closed signal for door 26, as will be explained in further detail herein.

Figure 3:
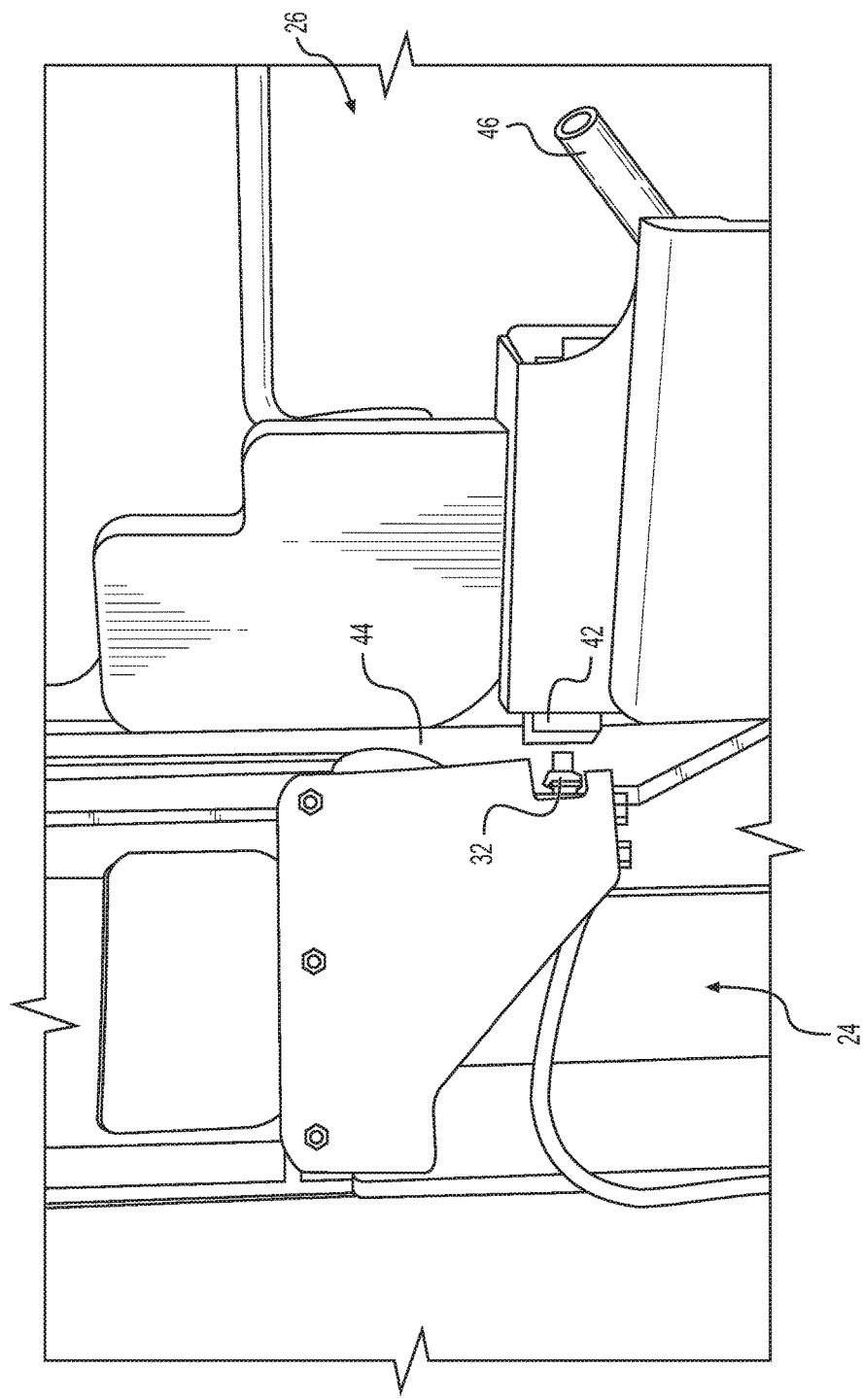
FIG. 3 is a partial perspective view of a portion of an interior of a cab of the machine of FIG. 1.

FIG. 3 illustrates an interior portion of cab 24 of machine 10, which shows door 26 in the fully closed and latched. When door 26 is in the fully closed and latched position as illustrated in FIG. 3, a latch 42 will contact a door frame 44 of cab 24, which will prevent door 26 from swinging open. Door 26 may include a door handle 46, which an operator may use to open door 26 when inside cab 24. Rotating door handle 46 may force latch 42 to slide toward door handle 46 and disengage from door frame 44 thereby enabling door 26 to swing open. Door sensor 32 may be mounted proximate to and aligned with latch 42 of door 26 in order to enable door sensor 32 to detect the presence or absence of latch 42, as illustrated in FIG. 3. As described herein, door sensor 32 may be configured to generate the closed signal when door 26 is in the fully closed and latched position, as illustrated in FIG. 3. If door 26 is not fully closed (e.g., latch 42 is not contacting and secured against door frame 44) then door sensor 32 will not detect latch 42 and as a result will not generate the closed signal.

In some embodiments, door sensor 32 may be a proximity sensor configured such that it does not physically contact latch 42, but instead door sensor 32 detects latch 42 when latch 42 comes within a specified range. For example, door sensor 32 may be positioned to detect latch 42 when latch 42 is within about 7 millimeters or less of door sensor 32. It is contemplated that other suitable types of door sensors may be utilized including for example contact or pressure type sensors.

Referring back to FIG. 2, ECM 30 may also be communicably coupled to a key switch module 36, a first alert indicator 38, and a second alert indicator 40, which may be part of operator station 27. An operator may use key switch module 36 to generate a key activation signal, which is sent to ECM 30 and triggers power on of machine 10. Key switch module 36 may be configured to generate the key activation signal in response to the rotation of a physical key (now shown) or other suitable operator input.

First alert indicator 38 and second alert indicator 40 may be any suitable type of indicator. For example, in some embodiments, first alert indicator 38 and/or second alert indicator 40 may be a visual and/or audio indicator. In some embodiments first alert indicator 38 may be an amber color light, which illuminates or flashes, and may be accompanied by an audio alarm. In some embodiments, second alert indicator 40 may be a red color light, which illuminates or flashes, and may be accompanied by an audio alarm. In other embodiments, operator station 27 may include a display panel (not shown) and first alert indicator 38 and second alert indicator 40 may be displayed on the display panel. First alert indicator 38 and second alert indicator 40 may be activated by ECM 30 and designed to alert the operator of machine 10 to one or more conditions. For example, first alert indicator 38 may be designed to indicate when there is an unacceptable condition or impending critical condition that needs monitoring and/or intervention. Second alert indicator 40 may be designed to indicate when there is a failure of a critical system, which needs immediate attention.

ECM 30 may be programmed to activate first alert indicator 38 when one or more operational conditions of machine 10 are present. For example, ECM 30 may be programmed to activate first alert indicator 38 when machine 10 is running (e.g., powered on), parking brake 34 is applied, and the closed signal for door 26 is not detected by ECM 30 (e.g., door 26 is not fully closed and latched). Activating first alert indicator 38 in this situation may be intended to draw the operator's attention to the fact that door 26 is not fully closed and latched. In another example, ECM 30 may be programmed to activate first alert indicator 38 when machine 10 is running (e.g., powered on), parking brake 34 is applied, and the operator initiates release of parking brake 34 (e.g., operator presses the park brake release switch on operator station 27), but the closed signal is not detected by ECM 30 (e.g., door 26 is not fully closed and latched). In another example, ECM 30 may be programmed to activate first alert indicator 38 when machine 10 is running (e.g., powered on), parking brake 34 is applied, and the operator initiates release of parking brake 34 (e.g., operator presses the park brake release switch on operator station 27), the closed signal is detected by ECM 30 (e.g., door 26 is fully closed and latched), but there is a failure in the communication between ECM 30 and door sensor 32. In some embodiments, in conjunction with activating first alert indicator 38, ECM 30 may neutralize transmission system 14 by sending a signal from ECM 30 to transmission system 14, which prevents movement of machine 10.

ECM 30 may be programmed to activate second alert indicator 40 when one or more operational conditions of machine 10 are present. For example, in some embodiments, ECM 30 may be programmed to activate second alert indicator 40 when machine 10 is running (e.g., powered on), parking brake 34 is applied, the operator initiates release of parking brake 34 (e.g., operator presses a park brake release switch on operator station 27), the closed signal is detected by ECM 30 (e.g., door 26 is fully closed and latched), but there is a failure in the communication between ECM 30 and door sensor 32. In another example, ECM 30 may be programmed to activate second alert indicator 40 when machine 10 is running (e.g., powered on), parking brake 34 is released, and the closed signal is not detected by ECM 30 (e.g., door 26 is not fully closed and latched) or there is a failure in the communication between ECM 30 and door sensor 32.

In some embodiments, ECM 30 may be programmed to activate second alert indicator 40 anytime there is a failure in the communication between ECM 30 and door sensor 32. In other embodiments, ECM 30 may be programmed to activate second alert indicator 40 when there is a failure in the communication between ECM 30 and door sensor 32 and the closed signal is not detected by ECM 30 (e.g., door 26 is not fully closed and latched). A failure in the communication between ECM 30 and door sensor 32 may be caused by a fault in the connection (e.g., one of the wires may not be properly grounded).

In some embodiments, ECM 30 may be programmed to generate an event log and log certain operational conditions, which may be referred to as events. For example, in some embodiments, ECM 30 may be programmed to log an event any time first alert indicator 38 is activated or second alert indicator 40 is activated. In some embodiments, ECM 30 may be programmed to log an event if machine 10 is running (e.g., powered on), parking brake 34 is released, the closed signal is not detected by ECM 30 (e.g., door 26 is not fully closed and latched) or there is a failure in the communication between ECM 30 and door sensor 32, and machine 10 is traveling at a speed above a speed threshold set point. The speed threshold set point may be programmable. In some embodiments, the speed threshold set point may be programmed to be about 3 kilometers per hour (kph). In some embodiments, a technician may access and review the event log by connecting to ECM 30 either directly or remotely.

INDUSTRIAL APPLICABILITY

Figure 4:
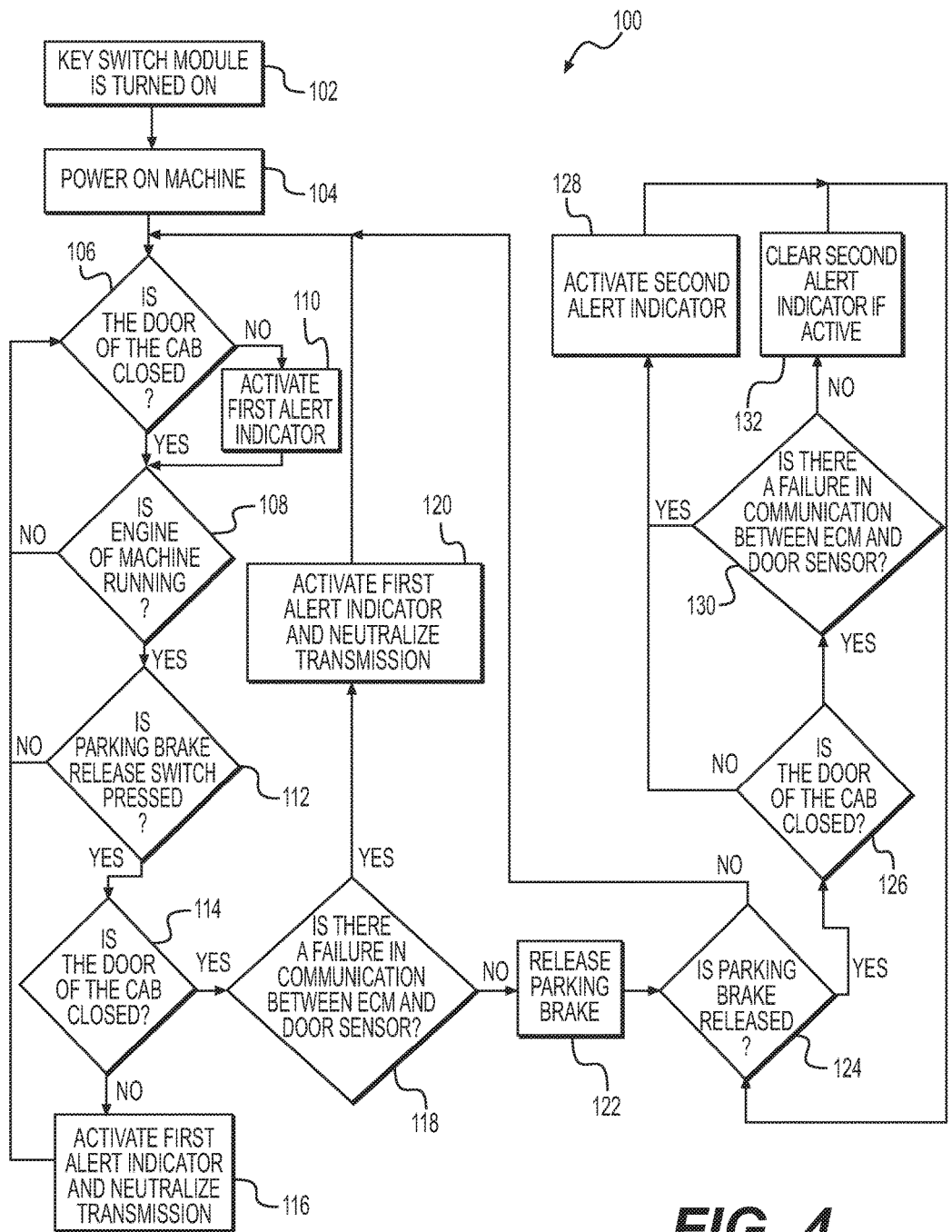
FIG. 4 is a flowchart depiction of an exemplary disclosed method of controlling the machine of FIG. 1 that may be performed by the control system of FIG. 2.

FIG. 4 is a flow chart illustrating an exemplary method 100, which may be performed by control system 28, for controlling some aspects of the operation of machine 10. ECM 30 may be programmed with instructions to execute the steps of method 100, as described herein.

Method 100 may begin when key switch module 36 is turned on (Step 102), which causes key switch module 36 to send the key activation signal to ECM 30. Upon receiving of the key activation signal, ECM 30 may power on machine 10 (Step 104), which may include turning on supply power to door sensor 32 and first and second alert indicators 38, 40.

In some embodiments, ECM 30 may flash first and second alert indicators 38, 40 as part of the power on sequence of step 104.

Following step 104, method 100 may confirm whether door 26 of cab 24 is closed (Step 106). In some embodiments, prior to proceeding to step 106, ECM 30 may auto detect whether machine 10 is equipped with door sensor 32, in which case ECM 30 may proceed to step 106. As described herein, the closed signal from door sensor 32 may be used to confirm whether door 26 of cab 24 is closed. If door 26 of cab 24 is closed (Step 106: Yes), ECM 30 may clear or deactivate first alert indicator 38 if currently active and proceed to step 108. If door 26 of cab 24 is not closed (Step 106: No), ECM 30 may activate first alert indicator 38 (Step 110), and then proceed to step 108. At step 108, ECM 30 may confirm whether the engine of machine 10 is running. If the engine of machine 10 is not running (Step 108: No), ECM 30 may return to step 106. If the engine of machine 10 is running (Step 108: Yes), ECM 30 may proceed to step 112. At step 112, control system may confirm whether the parking brake release switch is pressed. If the parking brake release switch is not pressed (Step 112: No), ECM 30 may return to step 112. If the parking brake release switch is pressed (Step 112: Yes), ECM 30 may proceed to step 114. At step 114, ECM 30 may again confirm whether door 26 of cab 24 is closed. If door 26 of cab 24 is not closed (Step 114: No), ECM 30 may activate first alert indicator 38 and neutralize transmission system 14 (Step 116), and then may return to step 106. If door 26 of cab 24 is closed (Step 114: Yes), ECM 30 may proceed to step 118 of method 100. In other words, the execution of step 114 by ECM 30 prevents the release of parking brake 34 of machine 10 when ECM 30 does not detect the closed signal from door sensor 32 for door 26.

At step 118, ECM 30 can confirm whether there is a failure in communication between ECM 30 and door sensor 32. If there is a failure in communication between ECM 30 and door sensor 32 (Step 118: Yes), ECM 30 may activate first alert indicator 38 and neutralize transmission system 14 (Step 120), and then may return to step 106. If there is not a failure in communication between ECM 30 and door sensor 32 (Step 118: No), ECM 30 may trigger release of parking brake 34 (Step 122) and proceed to step 124. In other words, the execution of steps 114 and 118 by ECM 30 prevents the release of parking brake 34 of machine 10 when ECM 30 does not detect the closed signal from door sensor 32 for door 26 or when there is a failure in communication between ECM 30 and door sensor 32.

At step 124, ECM 30 can confirm whether the parking brake 34 is released. If parking brake 34 is not released (Step 124: No), ECM 30 may return to step 106. If parking brake 34 is released (Step 124: Yes), ECM 30 may proceed to step 126. At step 126, ECM 30 may again confirm whether door 26 of cab 24 is closed. If door 26 of cab 24 is not closed (Step 126: No), ECM 30 may activate second alert indicator 40 (Step 128), and then return to step 124. If door 26 of cab 24 is closed (Step 126: Yes), ECM 30 may proceed to step 130. At step 130, ECM 30 may confirm whether there is a failure in communication between ECM 30 and door sensor 32. If there is a failure in communication between ECM 30 and door sensor 32 (Step 130: Yes), control system 28 may proceed to step 128, and then return to step 124. If there is no failure in communication between ECM 30 and door sensor 32 (Step 130: No), ECM 30 may clear second alert indicator 40 if it is active (Step 132), and then return to step 124.

ECM 30 when it returns to step 124 may again confirm whether parking brake 34 is released and so long as parking brake 34 remains released (Step 124: Yes), ECM 30 may repeatedly cycle through a combination of step 126, step 128, step 130, and/or 132, according to the sequence illustrated in FIG. 4. In other words, while parking brake 34 is released, ECM 30 will continuously monitor whether door 26 of cab 24 is closed (Step 126) and whether there is a failure of communication between ECM 30 and door sensor 32 (Step 130), and ECM 30 will respond accordingly by executing either step 128 or step 132. If when ECM 30 returns to step 124 and parking brake 34 is not released (i.e., engaged) (Step 124: No), ECM 30 may return to step 106 enabling the sequence of steps to be restarted.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented. Other embodiments will be apparent to those skilled in the art from consideration of the specification and practice of the disclosed concepts. It is intended that the specification and examples be considered as exemplary only, with a true scope being indicated by the following claims and their equivalents.

What is claimed is:

1. A control system for a machine, the control system comprising:
   a door sensor configured to generate a closed signal when a door of a cab of the machine is in a closed position;
   a first alert indicator;
   a second alert indicator; and
   an Electronic Control Module (ECM) communicably coupled to the door sensor, the first alert indicator, and the second alert indicator, the ECM being configured to
      detect the closed signal,
      prevent release of a parking brake of the machine if the ECM does not detect the closed signal for the door,
      activate the first alert indicator in response to detecting a failure in communication between the door sensor and the ECM, and
      illuminate the second alert indicator when the machine is running, the parking brake is released, and the closed signal is not detected by the ECM.

2. The control system of claim 1, wherein the door sensor determines when the door is in the closed position by detecting a presence of a latch of the door.

3. The control system of claim 2, wherein the door sensor is a proximity sensor that does not contact the latch of the door.

4. The control system of claim 1, wherein the ECM is further configured to illuminate the first alert indicator when the machine is running, the parking brake is applied, and the closed signal is not detected by the ECM.

5. The control system of claim 1, wherein the ECM is further configured to neutralize a transmission of the machine when the machine is running and the first alert indicator is activated.

6. The control system of claim 1, wherein the ECM is programmed to log an event if the closed signal for the door is not detected while the machine is moving and traveling at a speed above a speed threshold set point.

7. The control system of claim 1, wherein the parking brake is applied by a spring and hydraulically released.

8. The control system of claim 1, wherein the door of the machine is located in a front of the cab of the machine and opens into a center of the machine.

9. A method for controlling operation of a machine, the method comprising:
   receiving a closed signal from a door sensor when a door of a cab of the machine is in a closed position;
   preventing release of a parking brake of the machine via an electronic control module (ECM) of the machine if the ECM does not detect the closed signal for the door;
   activating a first alert indicator via the ECM when the ECM detects a communication failure between the door sensor and the ECM; and
   activating a second alert indicator via the ECM when the machine is running, the parking brake is released, and the closed signal is not detected by the ECM.

10. The method of claim 9, wherein the door sensor determines when the door is in the closed position by detecting a presence of a latch of the door.

11. The method of claim 9, further comprising activating the first alert indicator via the ECM when the machine is running, the parking brake is applied, and the closed signal is not detected by the ECM.

12. The method of claim 11, further comprising neutralizing a transmission of the machine via the ECM when the machine is running and the first alert indicator is activated.

13. The method of claim 9, further comprising logging an event when the closed signal is not detected by the ECM while the machine is running and traveling at a speed above a speed threshold set point.

14. The method of claim 9, further comprising hydraulically releasing the parking brake, which is applied by a spring.

15. A machine, comprising:
   a work implement, a drive system, and a set of ground engaging members;
   a transmission system coupled to the drive system and the set of ground engaging members;
   a cab having a door configured to allow an operator to enter and exit the machine;
   a parking brake; and
   a control system communicably coupled to the transmission system, the control system comprising:
      a door sensor configured to generate a closed signal when the door is in a closed position;
      a first alert indicator;
      a second alert indicator; and
      an Electronic Control Module (ECM) communicably coupled to the door sensor, the first alert indicator, and the second alert indicator, the ECM being configured to
         detect the closed signal,
         prevent release of the parking brake if the ECM does not detect the closed signal for the door,
         activate the first alert indicator in response to detecting a failure in communication between the door sensor and the ECM, and illuminate the second alert indicator when the machine is running, the parking brake is released, and the closed signal is not detected by the ECM.

16. The machine of claim 15, wherein the door sensor determines when the door is in the closed position by detecting a presence of a latch of the door.

* * * * *